United States Patent
Perego (10) Patent No.: US 6,772,315 B1
(45) Date of Patent: Aug. 3, 2004

(54) TRANSLATION LOOKASIDE BUFFER EXTENDED TO PROVIDE PHYSICAL AND MAIN-MEMORY ADDRESSES

(75) Inventor: Richard E. Perego, San Jose, CA (US)

(73) Assignee: Rambus Inc, Los Altos, CA (US)

( * ) Notice: Subject to any disclaimer, the term of this patent is extended or adjusted under 35 U.S.C. 154(b) by 367 days.

(21) Appl. No.: 09/867,002

(22) Filed: May 24, 2001

(51) Int. Cl.[7] .............................................. G06F 12/02
(52) U.S. Cl. ..................... 711/207; 711/117; 711/118; 711/202; 711/203; 711/204; 711/205; 711/206
(58) Field of Search ................................ 711/117, 118, 711/202–207

(56) References Cited

U.S. PATENT DOCUMENTS

| | | | | |
|---|---|---|---|---|
| 4,654,790 A | * | 3/1987 | Woffinden ................... | 711/207 |
| 4,695,950 A | * | 9/1987 | Brandt et al. ................ | 711/207 |
| 5,530,824 A | * | 6/1996 | Peng et al. .................. | 711/207 |
| 5,539,895 A | * | 7/1996 | Bishop et al. ............... | 711/138 |
| 5,546,555 A |   | 8/1996 | Horstmann et al. ......... | 395/417 |
| 5,926,832 A |   | 7/1999 | Wing et al. .................. | 711/141 |
| 5,953,748 A |   | 9/1999 | Riordan ....................... | 711/207 |
| 6,233,652 B1 | * | 5/2001 | Mathews et al. ............ | 711/108 |
| 6,418,522 B1 | * | 7/2002 | Gaertner et al. ............. | 711/207 |

OTHER PUBLICATIONS

"Measuring Memory Hierarchy Performance of Cache–Coherent Multiprocessors Using Micro Benchmarks". Hristea, Lenoski, and Keen. 29 pages. Aug. 11, 1997 (last modified Aug. 15, 1997). http//www.supercomp.org/sc97/proceedings/TECH/HRISTEA/INDEX.HTM downloaded May 24, 2001.

Intel: Pentium Processor 75/90/100/120/133/150/166/200, 70 pages. (June 1997).

*Computer Architecture A Quantitative Approach*, John L. Hennessy and David Patterson. Morgan Kaufmann Publishers Inc., 1990. Chapter 8, pp. 403–497.

* cited by examiner

*Primary Examiner*—T. Nguyen
(74) *Attorney, Agent, or Firm*—Silicon Edge Law Group LLP; Arthur J. Behiel (57) ABSTRACT

A processor includes a translation look-aside buffer (TLB) that relates virtual page addresses to both physical page addresses and main-memory addresses. If the processor references a virtual page address in the TLB for which there is no corresponding information in cache, the processor passes the main-memory address directly to main memory, avoiding the latency normally associated with systems that translate a physical page address to a main-memory address before accessing information from main memory.

28 Claims, 4 Drawing Sheets

TRANSLATION LOOKASIDE BUFFER EXTENDED TO PROVIDE PHYSICAL AND MAIN-MEMORY ADDRESSES

BACKGROUND

Microprocessors, including those of the X86 and Pentium families of processors available from Intel, Inc., execute instructions and manipulate data stored in a main memory, typically some amount of dynamic random-access memory, or DRAM. Modern processors execute instructions far faster than instructions and data can be made available by reasonably priced DRAM. DRAM access times thus adversely affect processor performance.

Cache memory offers the most common solution to the DRAM bottleneck. Modern processors still use relatively slow and inexpensive DRAM for main memory, but also include a smaller amount of fast, expensive static RAM (SRAM) cache memory. The SRAM cache maintains copies of frequently accessed information read from DRAM. The processor then looks for instructions and data in the cache memory before resorting to the slower main memory.

Modern computer systems must typically reference a large number of stored programs and associated program information. The size of this information necessitates an economical mass storage system, which is typically comprised of magnetic disk storage. The access time of this mass storage is very long compared to access times of semiconductor memories such as SRAM or DRAM, motivating the use of a memory hierarchy. The concept of virtual memory was created to simplify addressability of information within the memory hierarchy and sharing of information between programs. The following is a formal definition of the term "virtual memory," provided in a classic text on the subject:

"Virtual memory is a hierarchical storage system of at least two levels, managed by an operating system (OS) to appear to the user as a single, large, directly-addressable main memory."

*Computer Organization*, 3$^{rd}$ ed., V. C. Hamacher, Z. G. Vranesic, S. G. Zacky, McGraw-Hill, New York, 1990). Further elaboration is provided in another commonly referenced text:

"The main memory can act as a 'cache' for the secondary storage, usually implemented with magnetic disks. This technique is called virtual memory. There are two major motivations for virtual memory: to allow efficient and safe sharing of memory among multiple programs and to remove the programming burden of a small, limited amount of main memory."

*Computer Organization and Design: The Hardware/Software Interface*, 2$^{nd}$ edition, David A. Patterson and John L. Hennessy, Morgan Kaufmann Publishers, Inc., San Francisco, Calif., 1998.

The upper levels of modern memory hierarchies typically include cache and main memory. "Cache is the name first chosen to represent the level of memory hierarchy between the CPU and main memory" (*Computer Architecture, a Quantitative Approach*, by Hennessy and Patterson, 1990, p408). "Main memory satisfies the demands of caches and vector units, and serves as the I/O interface as it is the destination of input as well as the source for output" (Id. at p. 425). Most main memories are composed of dynamic random-access memories, or DRAMs, while most caches are relatively faster static random-access memories, or SRAMs (Id. at p. 426). Most. modern systems subdivide the memory into pages (commonly, 4KB in size), and the OS swaps pages between the main memory and the disk storage system based on an appropriate page allocation and replacement scheme.

The virtual memory is addressed by virtual addresses, which must be translated to physical addresses before cache or main-memory accesses can occur. The translation is typically performed by an address translation unit in the processor, which accesses address translation information stored in the main memory. In an x86 architecture processor, the address translation information is stored hierarchically in the form of a Page Directory consisting of multiple Page Directory Entries (or PDES). Each PDE, in turn, references a Page Table consisting of multiple Page Table Entries (or PTEs). Each PTE, in turn, contains the physical address and attribute bits of the referenced page or Page Frame. For the specification of this invention, the translation information will be referred to herein generically as "address translation information" (ATI) and the structures used to store this information will be referred to herein as "address translation tables." The terms "page tables," "page directories," or "page tables and page directories" may be used interchangeably with "address translation tables."

Address translation tables are stored in main memory. Address translations that must reference this information thus suffer the same speed penalty as other references to main memory: namely, the CPU must wait many clock cycles while the system produces the physical address associated with a corresponding virtual address. Once again, cache memory offers the most common solution to the DRAM bottleneck. In this case, however, the cache is an address translation cache that stores the most commonly referenced set of virtual page addresses and the physical page address associated with each stored virtual page address. Using this scheme, the vast majority of address translations can be accomplished without the speed penalty associated with a request from main memory by providing the required physical address directly from the address translation cache after a small lookup time. Address translation caches are commonly referred to as translation lookaside buffers (TLBs), page translation caches (PTCs) or "translation buffers" (TBs). The term TLB will be used throughout the remainder of this specification to represent the aforementioned type of address translation cache. Many CPUs include more than one TLB due to a variety of reasons related to performance and implementation complexity.

Conventional microprocessor/main memory combinations are well understood by those of skill in the art. The operation of one such combination is nevertheless described below to provide context for a discussion of the invention.

Figure 1:
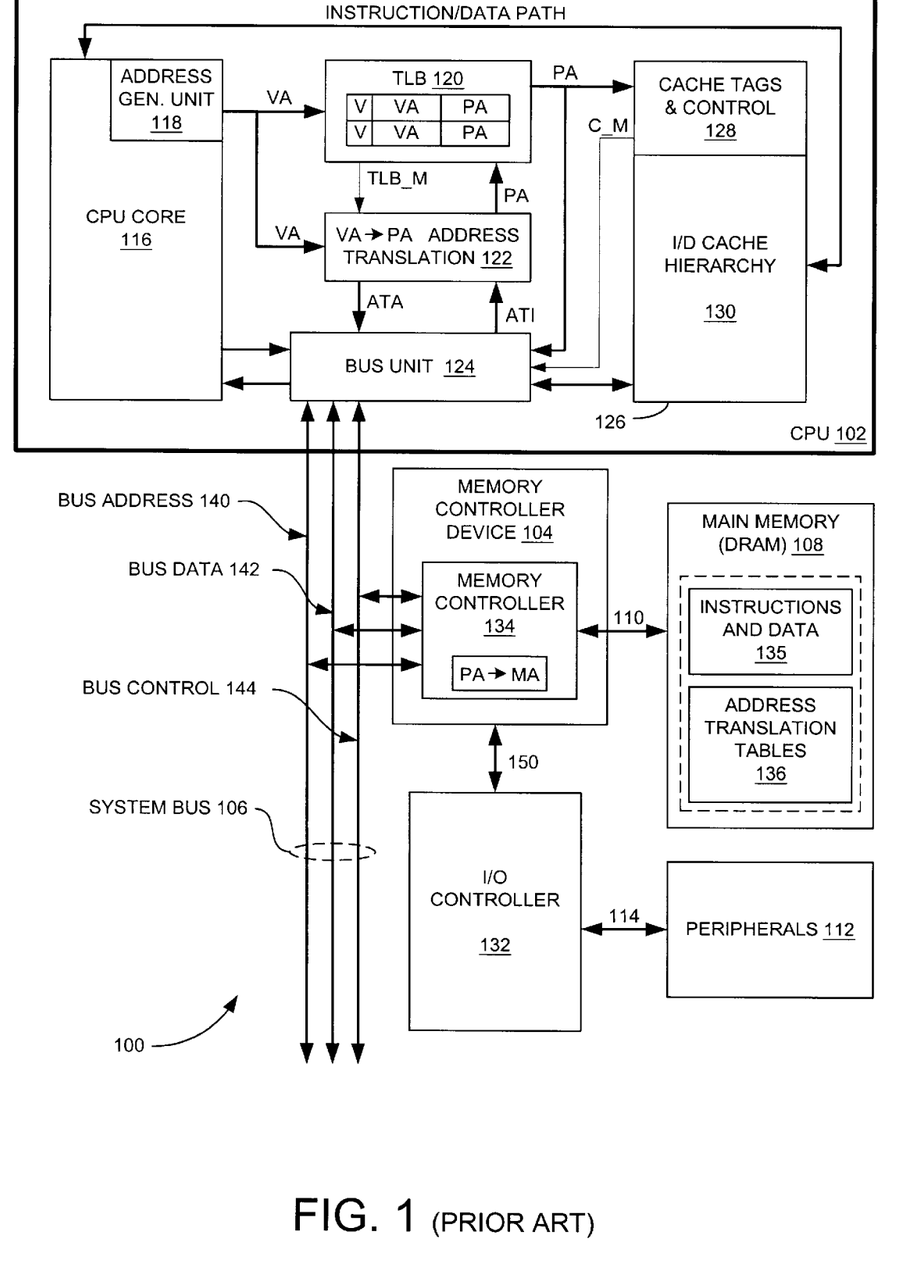
FIG. 1 depicts a portion of a conventional computer system 100.

FIG. 1 depicts a portion of a conventional computer system 100, including a central processing unit (CPU) 102 connected to a memory controller device 104 via a system bus 106. The memory controller device 104 acts as a bridge between CPU 102 and main memory 108. Other terms are often used in the computer industry to describe this type of bridge device, including "north bridge," "memory controller hub," or simply "memory controller." This device is often sold as part of a set of devices, commonly referred to as the system "chip set." Throughout this specification, the term "memory controller device" will be used to refer to the device that serves as the main memory bridge, while the term "memory controller" will refer more narrowly to the block of logic which controls main memory access.

Memory controller device 104 is connected to a main memory 108 via a communication port 110 and to an IO controller 132 via an IO controller interface 150. Other interfaces may be optionally provided as part of memory controller device 104, but those interfaces are beyond the scope of this specification. System bus 106 conventionally includes address lines 140, data lines 142, and control lines 144. Communication port 110 likewise includes main-memory address lines, data lines, and control lines. Most interfaces also include a synchronization mechanism consisting of one or more clocks or strobes, although, for simplicity, these clocks are not shown in the figures herein.

IO controller 132 interfaces to peripherals 112 via one or more peripheral interfaces 114. Peripherals might comprise one or more of the following: a keyboard or keyboard controller, hard disk drive(s), floppy disk drive(s), mouse, joystick, serial I/O, audio system, modem, or Local Area Network (LAN). Peripherals are mentioned here for clarification purposes although the specific set of peripherals supported and means of interfacing to them are omitted for brevity.

CPU 102 includes a CPU core 116, which includes an address generation unit 118, an address translation unit 122, a bus unit 124, and a cache memory 126. Address generation unit 118 represents the unit or units that generate virtual addresses, which may include address calculation unit(s), load/store unit(s), instruction prefetch unit(s), data prefetch unit(s), or other sources. Cache memory 126 represents a simplified view of the on-chip cache hierarchy. Modern processors typically use a 2-level on-chip cache hierarchy consisting of a Level 1 cache and Level 2 cache, although fewer or more levels may be used. Level 1 caches are commonly split between instruction and data caches, while Level 2 caches are more commonly unified to contain a combination of instructions and data. Each physical cache is further subdivided into one or more cache tag sections, cache control sections, and data storage sections. FIG. 1 abstracts this level of detail to simply show the cache tags and control separate from the data section. As with most modern processors, CPU 102 includes a TLB 120 for storing the most commonly referenced virtual page addresses and their corresponding physical page addresses to greatly reduce the need to refer to address translation tables stored in main memory. Some CPUs include multiple TLBs, in some cases, separating instruction TLBs from data TLBs.

TLB 120 conveys physical addresses PA directly to cache memory 126 and to memory controller device 104 via bus unit 124 and system bus 106. Memory controller device 104 includes a memory controller 134 that translates physical addresses PA to a main-memory addresses MA suitable for accessing data and instructions in a portion 135 of main memory 108. Main memory 108 is typically DRAM. As mentioned previously, main memory 108 includes address translation tables 136 that store the requisite information for translating virtual page addresses into physical page addresses (VA–>PA).

CPU core 116 executes instructions and manipulates data obtained in a portion 135 of main memory 108 using a series of memory references. Fetching instructions and reading from or writing to main memory 108 requires a bus transaction, during which bus unit 124 communicates with memory controller device 104 to read from or write to main memory 108.

Address generation unit 118 of CPU core 116 presents a virtual page address VA to TLB 120 and directly or indirectly to address translation unit 122. If the specified virtual page address and an associated physical page address PA are stored in TLB 120, then TLB 120 presents the corresponding physical page address PA together with a page offset to cache tags and control circuitry 128. There is a relatively high probability that the requested data or instruction resides in the on-chip cache 126. For cache hits, the requested memory reference is returned to the CPU core 116 via an instruction/data path 133. Cache hit/miss status is returned to bus unit 124 via the cache-miss signal C_M to indicate whether a bus transaction is necessary across system bus 106.

If CPU core 116 presents a virtual page address VA for which there is no corresponding address translation in TLB 120, then TLB 120 issues a TLB miss signal on line TLB_M. Address translation unit 122 responds by requesting a bus transaction from bus unit 124 to retrieve address translation information (ATI) from an address translation table section 136 of main memory 108. Address translation unit 122 provides an address translation address ATA to memory controller device 104 via bus unit 124 and system bus 106. The address translation address ATA typically identifies the location or a pointer to the location of the address translation table entry containing the physical page address of the requested memory reference. The number of levels of indirection or levels of address translation table hierarchy is implementation-dependent.

Memory controller 134 converts the address translation address ATA to a main-memory address MA, typically consisting of device/rank, bank, row, and column address fields, to access the requested address translation information ATI. The translation of a physical address PA to a main-memory address MA is generally dependent upon the installed memory configuration. Most computer systems support a variety of possible memory configurations and provide a mechanism to communicate the installed configuration information to the system for proper addressability.

A memory request is issued from memory controller 134 containing main-memory address MA. Main memory 108 then returns the appropriate address translation information ATI stored at address MA to address translation unit 122 via memory controller device 104, system bus 106, and bus unit 124. Address translation unit 122 computes the appropriate physical page address PA using the ATI and stores the result in TLB 120, potentially replacing a previous TLB entry. The translation is then available from TLB 120 for presentation to cache 126. The translated physical address could also be delivered directly from the address translation unit 122 to cache memory 126 to reduce access latency.

If the requested data or instruction is in cache 126, then, as before when TLB 120 contained the appropriate virtual-to-physical page address translation, cache 126 presents the requested data or instruction to CPU core 116. This type of memory access requires at least one bus transaction to obtain the address translation information ATI, and is therefore significantly slower then the scenario in which the translation existed in TLB 120.

Slower still, the requested virtual page address VA may be absent from TLB 120 and the requested data or instruction information may be absent from cache 126. Such a condition requires at least two bus transactions or series of transactions. The first bus transaction or series of transactions obtains the address translation information corresponding to the requested virtual page address VA. The second bus transaction or series of transactions retrieves the requested data or instruction in main memory 105 that will be returned to CPU core 116 and cache 126. Once again, memory controller 134 must translate the physical page address PA into a main-memory address MA before the requested information can be accessed in main memory 108. The latency associated with this translation typically degrades system performance. Furthermore, the number of possible physical-to-main memory address mappings supported by modern memory controllers must be kept reasonably small to avoid further increases to address translation latency. A mechanism or technique that could reduce the average latency associated with physical-to-main-memory address translation while potentially increasing the flexibility of address mapping support would therefore be very desirable.

SUMMARY

The present invention is directed to a processor that speeds references to main memory by storing main-memory addresses in a TLB. As with conventional TLBs, a TLB in accordance with the invention includes a number of entries, each including a virtual-address field and a physical-address field. Unlike conventional TLBs, however, each entry of the TLB of the present invention additionally includes a main-memory address field.

In the event of a TLB hit coupled with a cache miss, the processor passes the main-memory address in the TLB directly to the memory controller, avoiding the latency normally associated with systems that must translate a physical page address to a main-memory address before accessing information from main memory. The use of this type of mechanism generally allows greater flexibility in performing the physical-to-main memory address translation because translation latency is no longer in a latency-critical path.

The claims, and not this summary, define the scope of the invention.

DETAILED DESCRIPTION

Figure 2:
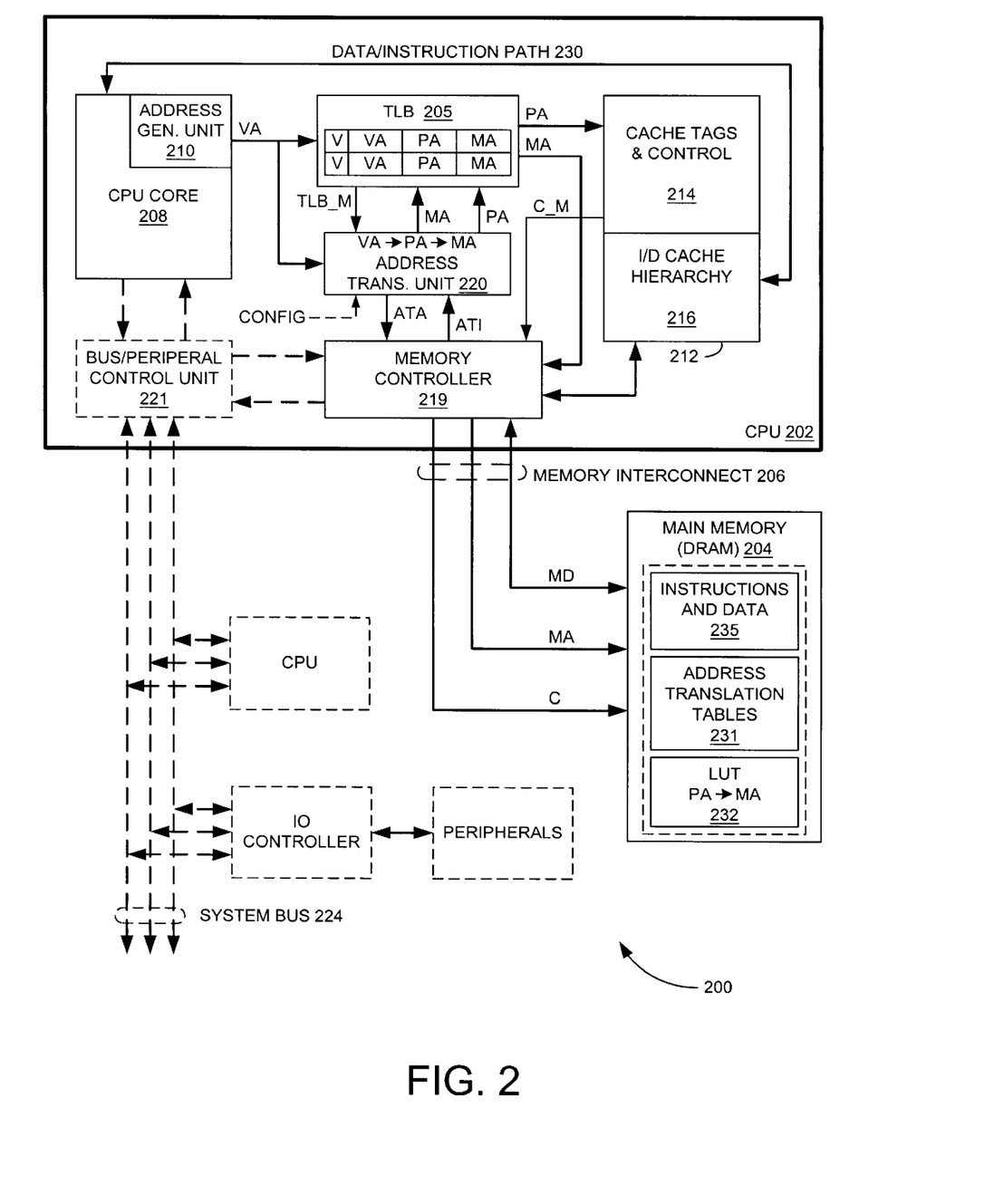
FIG. 2 depicts a computer system 200 configured in accordance with the invention to speed access to data and instructions in main memory in the event of a cache miss.

FIG. 2 depicts a computer system 200 configured in accordance with the invention to speed access to data and instructions in main memory in the event of a cache miss. System 200 includes a CPU 202 connected to a main memory 204 via a memory interconnect 206 (e.g., a memory bus). A TLB 205 is extended in accordance with the invention to include a main-memory address field MA in each TLB entry. Storing the main-memory addresses MA in TLB 205 reduces the latency normally associated with translating physical addresses into main-memory addresses.

As in the conventional system 100 of FIG. 1, CPU 202 includes a CPU core 208, including an address generation unit 210, and a cache memory 212. As stated above with reference to FIG. 1, the address generation unit 210 represents the unit or units that generate virtual addresses, which may include load/store unit(s), instruction prefetch unit(s), data prefetch unit(s), or other sources. The exact source of the virtual addresses is beyond the scope of this disclosure, and is therefore omitted for brevity.

Cache memory 212 includes cache tags and control circuitry 214 and an instruction/data cache hierarchy 216. As stated above with reference to FIG. 1, Cache memory 126 represents a simplified view of the on-chip cache hierarchy. Modern processors typically use a 2-level on-chip cache hierarchy consisting of a Level 1 cache and Level 2 cache, although fewer or more levels may be used. Level 1 caches are commonly split between instruction and data caches, while Level 2 caches are more commonly unified to contain a combination of instructions and data. Each physical cache is further subdivided into one or more cache tag sections, cache control sections, and data storage sections. FIG. 2 abstracts this level of detail to simply show the cache tags and control separate from the data storage section. Cache tags and control circuitry 214 conventionally includes an internal cache-memory directory that keeps track of addresses stored in cache 212, performs hit/miss detection for addresses presented to it, and controls validation and replacement of entries stored within it.

System 200 also includes a TLB 205 and an address translation unit 220, both of which are modified in accordance with the invention to relate virtual page addresses VA to both physical page addresses PA and main-memory addresses MA. A memory controller 219 communicates with main memory 204 over memory interconnect 206. CPU 202 optionally includes a bus/peripheral control unit 221 to communicate with other system devices via a system bus 224. The items depicted using broken lines are exemplary optional extensions, and can be included to support peripheral devices or legacy devices, for example. In another embodiment, main memory 204 connects to CPU 202 via system bus 224. This embodiment eliminates the need for memory-interconnect bus 206, but suffers some performance degradation due to the incremental latency required to cross an additional device boundary.

CPU 202 can include additional circuits that either share TLB 205 or are provided with a separate TLB that relates virtual page addresses to main-memory addresses. For example, CPU 202 can include a separate graphics controller (not shown).

TLB 205 is shown to include two entries, though a typical implementation includes many more. Modern CPUs typically include TLBs that range in size from approximately 32 to 512 entries. Each TLB entry stores a valid field V indicating whether the entry contains a valid translation, a virtual address field VA, a physical address field PA, and a main-memory address field MA. The fields are named after their respective contents. Each entry conventionally includes additional information depending upon the application. Other fields might include, for example, a protection field, a region attribute field (specifying cacheability, cache policy, write combining support, etc.), a use bit, or a dirty bit. A discussion of these and other conventional elements are omitted here for brevity.

When executing a series of instructions, CPU core 208 presents a virtual page address VA to TLB 205 and directly or indirectly to address translation unit 220. If the specified virtual page address VA and an associated physical page address PA are stored in TLB 205, then TLB 205 presents the corresponding physical page address PA, together with a page offset, to cache tags and control circuitry 214. There is a relatively high probability that the requested data or instruction resides in the on-chip cache 212. For cache hits, the requested memory reference is returned to the CPU core 116 via an instruction/data path 230. Cache hit/miss status is returned to memory controller 219 via the cache miss signal on line C_M signal to indicate whether a main memory transaction is necessary.

If CPU core 208 presents a virtual page address VA for which there is no entry in TLB 205, then TLB 205 issues a TLB miss signal on line TLB_M. Address translation unit 220 responds by requesting a main memory transaction from memory controller 219 to retrieve address translation information ATI from address translation tables 231 of main memory 204. Upon receipt of address translation information ATI by address translation unit 220, the physical page address PA is computed, stored in the TLB 205, and forwarded to cache memory 212 either directly or indirectly via TLB 205.

Having computed the physical page address PA, address translation unit 220 then performs the physical-to-main memory (PA–>MA) translation by referencing supplied memory configuration information (CONFIG). The physical-to-main memory (PA–>MA) translation can be implemented via hard-wired logic, via reference to a lookup table (LUT) 232 in main-memory 204, or via a combination of these approaches. If the LUT technique is used, at least one additional main memory transaction will be required to obtain the necessary physical-to-main memory address translation information. Having received all necessary address translation information, address translation unit 220 computes the main memory address MA and forwards the main memory address MA to the TLB 205 for storage/replacement as well as to memory controller 219 in the event of a cache miss.

TLB misses are generally infrequent, as a percentage of total memory references in modern CPU designs, and TLB miss/translation latencies can be quite lengthy relative to the clock speed of the CPU. These latencies are due to a number of factors, including the inherent latency of the main memory system, the potential need for multiple accesses to address translation tables stored within that memory, and the latency of performing subsequent address calculations and forwarding the results to the appropriate destinations. The infrequency of TLB misses affords an opportunity to perform a more complex physical-to-main-memory address translation with minimal performance degradation. While the depicted embodiment employs a look-up table 232 in main memory 204 to provide physical-to-main-memory address translations, in other embodiments, address translation unit 220 includes logic for accomplishing the translation.

In the depicted embodiment, the size of lookup table 232 is a function of the installed main-memory capacity, system page size, and the number of main-memory address bits stored per lookup table entry. Systems with small installed memory capacities could potentially use smaller lookup tables. For example, a system configured with 256 megabytes of DRAM ($2^{28}$) using four-kilobyte pages ($2^{12}$) would require $2^{28-12}=2^{16}=64$ K physical page addresses to be re-mapped to main-memory page addresses. Assuming 32-bits (=4 bytes) of main-memory address per lookup table entry, this configuration would result in a lookup table size of 256 kilobytes, which is less than $1/1000$ of the total main memory capacity in this representative system. This lookup table could optionally be hierarchically organized with multiple levels of indexing and a flexible allocation scheme similar to the way the virtual-to-physical translation tables are typically stored and managed by the operating system. There are many possible tradeoffs between translation-table size, hardware complexity, and address translation flexibility.

The table lookup scheme described above in connection with FIG. 2 allows a minimal-hardware implementation in which independent translation algorithms can be applied to different regions of physical memory based upon variations in the nature of expected memory access patterns. Table lookup schemes are much more flexible than dedicated hardware schemes, and this flexibility provides opportunities for tuning the system for peak performance.

In requesting virtual-to-physical and physical-to-main-memory address translation information from main memory 204, address translation unit 220 provides an address translation address ATA to memory controller 219. Memory controller 219 retrieves address-translation information ATI from main memory 204 and conveys this information to address translation unit 220. Address translation unit 220 then computes the appropriate address translation using the ATI and stores the result in TLB 205. The physical page address PA corresponding to the requested virtual address VA is then available in TLB 205 for presentation to cache 212.

If the requested data or instruction is in cache 212, then, as before when TLB 205 contained the appropriate virtual-to-physical page address translation, cache 212 presents the requested data or instruction to CPU core 208 via instruction/data path 230. The need for the bus transaction or series of transactions to obtain the address translation renders this form of memory access significantly slower then the case in which the requisite translation was already available in TLB 205.

System 200 saves further time over conventional systems if the translation for the requested virtual page address VA is in TLB 205 but the data or information corresponding to the virtual address is not in cache 212. Whereas the conventional system 100 of FIG. 1 required memory controller 134 to translate the physical page address PA to a main memory address MA, system 200 accomplished the translation during a previous bus cycle and stored the resulting main memory address MA in an entry of TLB 205 corresponding to the requested virtual page address VA. Thus, in response to a TLB hit and a cache miss, memory controller 219 directly accesses the requested data or instruction in portion 235 of main memory 204 using the main memory address MA from TLB 205. Assuming the memory reference is cacheable, a cache line fill occurs which returns the requested cache line to cache 212. Cache control logic 214 then forwards the requested memory reference to CPU core 208 via instruction/data path 230.

To accommodate the additional functionality described herein, TLB 205 is extended according to the number of bits used to store the main-memory address MA associated with each physical page address PA. For example, a CPU with 32 bits of physical address (four gigabytes) using a four-kilobyte physical page size requires twenty bits to address each physical page, leaving twelve bits to specify page offsets.

Approximately the same number of bits would be required for the main memory page address storage for a memory controller that can address up to four gigabytes of main memory. However, if the maximum amount of main memory supported is less than this amount, fewer bits could be allocated for the main memory page address storage. The main memory page address field of the TLB would typically be divided into sub-fields according to device/rank, bank, row, and potentially column bit fields. According to one embodiment, each of these sub-fields can include enough bits to cover the maximum supported range for the sub-field, depending upon the range of memory configurations supported by the memory controller.

As DRAM densities increase, DRAM row or page sizes typically increase as well. A 256-megabit density RDRAM design generally uses a two-kilobyte page size. (RDRAM, for Rambus DRAM, is a type of memory commercially available from the assignee of the present application.) In a system design where two parallel Rambus channels are operated in lock-step, the DRAM subsystem page is four kilobytes, exactly matching the physical page size of the most common operating systems in use today. As main memory page sizes increase beyond the level of operating-system physical page sizes, multiple TLB entries could theoretically map to a single main memory page. In this event, one or more bits of the main memory column address would typically be stored in the main memory page address field of the TLB.

CPU 202 connects directly to main memory 204; in other embodiments, the CPU can connect to main memory via a system bus in the manner described above in connection with FIG. 1.

Figure 3:
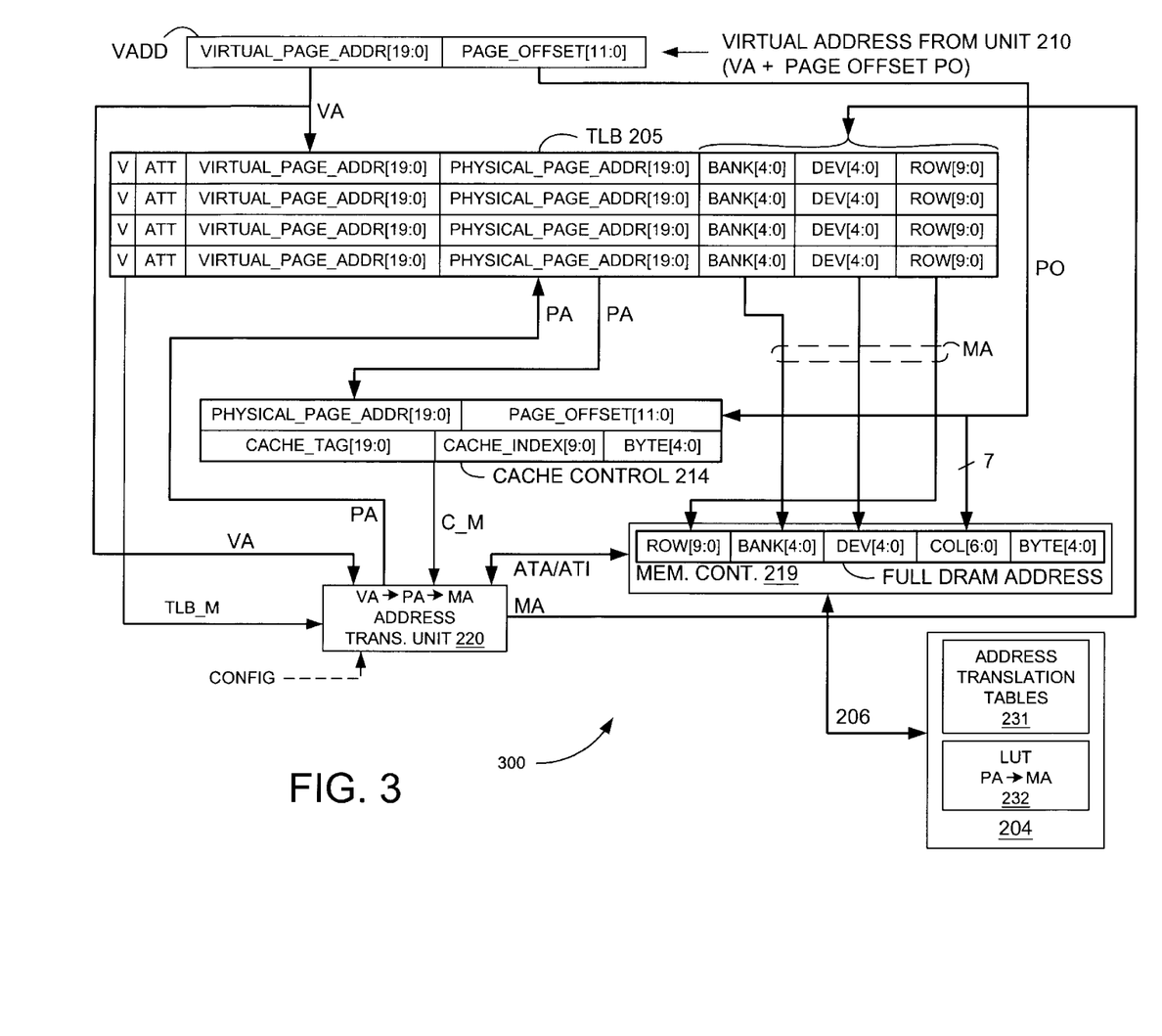
FIG. 3 graphically depicts one embodiment of an address translation scheme used in accordance with system 200 of FIG. 2.

FIG. 3 graphically depicts one embodiment for the handling of address information according to system 200 of FIG. 2. As is conventional, virtual addresses (VADD) include both a virtual page address VA and a page offset PO. The complete virtual address VADD and physical address typically have the same page offset PO: only the page addresses (VA and PA) differ. Thus, TLB 205 does not include a field for the page offset PO, which is instead conveyed directly to cache control 214 and memory controller 219.

The example of FIG. 3 assumes a DRAM main memory for which main-memory addresses are expressed using row, bank, device, column, and byte fields. An exemplary format is shown as the full DRAM address within memory controller 219. The main-memory address MA described in FIG. 2 only specifies the main-memory bank, device, and row of the requested information. Cache control 214 combines the physical page address PA with the page offset PO to create a complete physical address. Memory control 219 combines the main-memory address MA with seven bits of page offset PO to specify the appropriate row, bank, device, and column—though not necessarily in that order—for the region in main memory (e.g., DRAM) 204 that includes the information referenced using the virtual address VADD. Memory controller 219 does not require byte-specific addressing information because the depicted embodiment transfers information from main memory 204 to cache 212 in 32-byte blocks.

Figure 4:
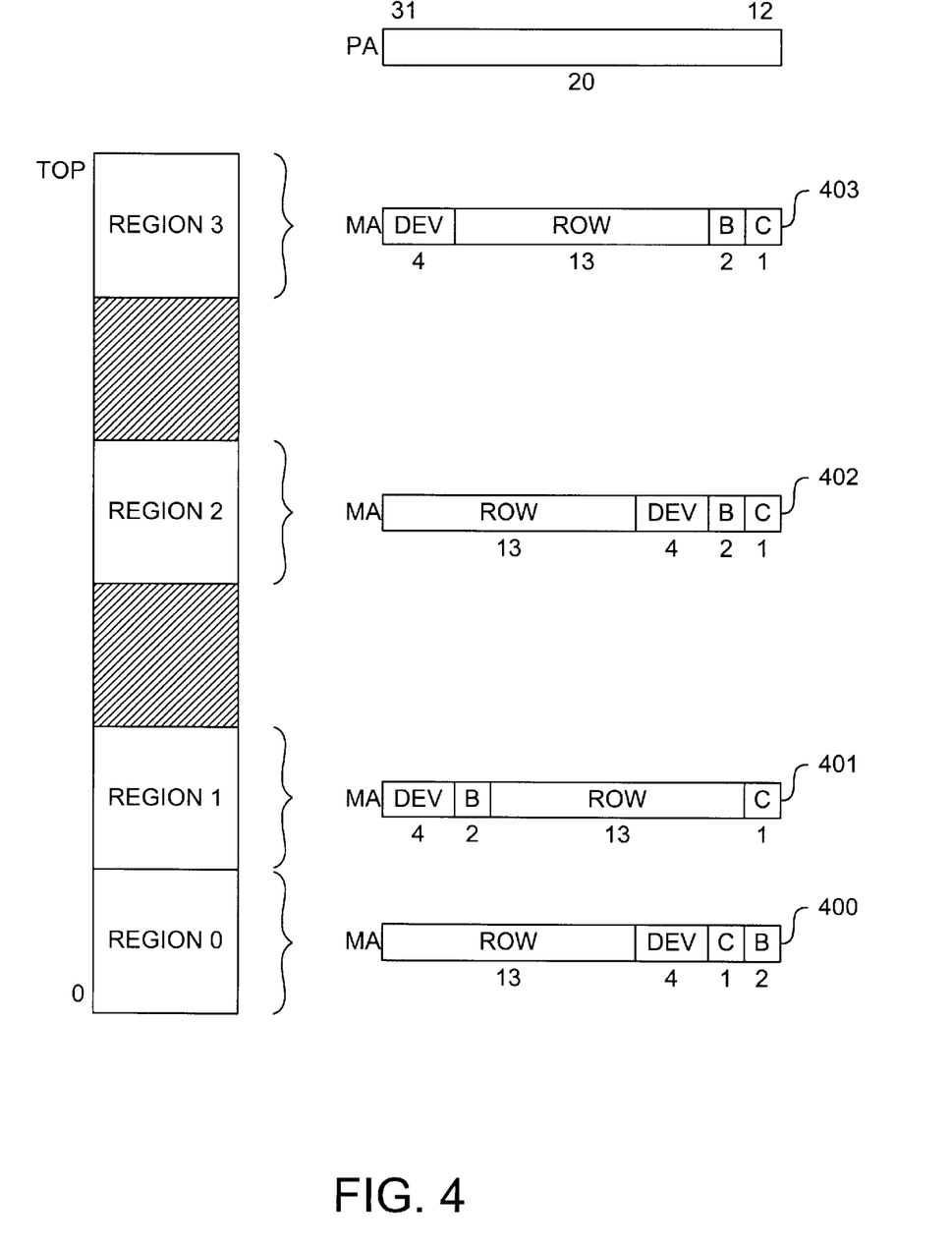
FIG. 4 shows an example of a flexible physical-to-main-memory address translation applied according to region, where each region represents a range of physical addresses.

FIG. 4 shows an example of a flexible physical-to-main-memory address translation applied according to region, where each region represents a range of physical addresses. In this figure, four separate regions (region 0 through region 3) are illustrated corresponding to non-overlapping address ranges within the physical address space. During a physical-to-main memory address translation, the address translation unit can perform bounds checking to determine which region the requested memory reference falls within. Hardware can then modify the physical-to-main memory address mapping based upon the selected region. For the example illustrated in FIG. 4, accesses to region 0 would use main memory address format 400; accesses to region 1 would use main memory address format 401; accesses to region 2 would use main memory address format 402; and accesses to region 3 would use main memory address format 403. Of course, there are many other mappings and sub-field bit ranges possible. The motivation for supporting multiple physical-to-main memory address mappings is to improve main memory efficiency or latency by tuning the address mapping according to the access characteristics of the requester accessing the target region.

In conventional systems, supporting a highly flexible physical-to-main memory address translation by region would normally increase the time required to perform the translation, thereby increasing average main memory access latency. The described invention overcomes this limitation by storing the translated main memory addresses in a TLB, thus providing very low latency translations for references which hit in the TLB, while significantly reducing the frequency of performing the more complex translation computation.

Many details of modern memory systems have been omitted here for brevity. Readers interested in a more detailed treatment of memory design, including extensive descriptions of virtual addresses, cache memory, and TLBs, may refer to chapter 8 of "Computer Architecture, a Quantitative Approach," by Hennessy and Patterson (1990), which is incorporated herein by reference.

While the present invention has been described in connection with specific embodiments, variations of these embodiments will be obvious to those of ordinary skill in the art. For example, a device adapted in accordance with this invention may contain either an internal or external memory controller; it may contain multiple TLBs, one or more of which contain main memory addresses; any of those TLBs containing main memory addresses may be addressed with either virtual or physical addresses; any such TLBs containing main memory addresses and addressed with virtual addresses may optionally include a physical address field. Furthermore, there are multiple possible types of requesters which can perform an access to a TLB adapted in accordance with this invention; the aforementioned requester types might include a CPU, a graphics engine, a block transfer engine, a DMA engine, a compression/decompression engine, an I/O module, or virtually any type of requestor that requires access to main memory. Therefore, the spirit and scope of the appended claims should not be limited to the foregoing description.

What is claimed is:

1. A processor adapted to receive instructions and data from a main memory over a memory interconnect, the processor comprising:
   a. a processor core adapted to execute the instructions, the processor core having a virtual-address output port adapted to output virtual addresses; and
   b. a translation look-aside buffer (TLB) having:
      i. a virtual-address input port connected to the virtual-address output port of the processor core; and
      ii. a plurality of TLB entries, each TLB entry including a virtual address field, a physical-address field, and a main-memory address field.

2. The processor of claim 1, further comprising an address-translation unit having a second virtual-address input port connected to the virtual-address output port of the processor core.

3. The processor of claim 2, wherein the TLB further comprises a miss terminal adapted to indicate a cache miss when the processor core presents bits of a virtual address absent from the virtual address fields.

4. The processor of claim 3, wherein the miss terminal connects to the address-translation unit.

5. The processor of claim 4, further comprising a memory controller having a memory-controller input port adapted to receive an address translation table address from the address-translation unit and a memory-controller output port connected to the memory interconnect.

6. The processor of claim 5, wherein the memory controller further comprises a second input port connected to the TLB and adapted to receive information from the main-memory address field of the TLB.

7. The processor of claim 1, wherein the processor is instantiated on a first semiconductor die and at least a portion of the main memory is instantiated on a second semiconductor die.

8. The processor of claim 1, wherein the memory-interconnect comprises at least a portion of a system bus.

9. A translation look-aside buffer (TLB) having a plurality of TLB entries, each TLB entry comprising:
   a. a virtual address field storing a virtual address;
   b. a physical address field storing a physical address mapped to the virtual address; and
   c. a main-memory address field storing a main-memory address different from the physical address.

10. The TLB of claim 9, wherein the main-memory address field includes a row field.

11. The TLB of claim 9, wherein the main-memory address field includes a bank field.

12. The TLB of claim 9, wherein the main-memory address field includes a column field.

13. The TLB of claim 9, wherein the main-memory address field includes a device field.

14. A processor adapted to receive instructions and data from a main memory over a main-memory-interconnect, the processor comprising:
   a. a processor core adapted to execute the instructions, the processor core having a virtual-address output port adapted to output virtual addresses;
   b. a translation look-aside buffer (TLB) having:
      i. a virtual-address input port connected to the virtual-address output port of the processor core;
      ii. a plurality of TLB entries, each TLB entry including a virtual address field, a physical address field, and a main-memory address field separate from the physical address field;
      iii. a main-memory-address output port; and
      iv. a TLB miss terminal adapted to produce a miss signal when the processor core presents, on the virtual-address output port, a virtual address absent from the virtual address fields of the TLB entries; and
   c. an address translation unit having a first translation-unit input port connected to the virtual-address output port and a second translation-unit input port connected to the miss terminal, wherein the address translation unit is adapted to translate the virtual addresses to corresponding main-memory addresses in response to the miss signal from the TLB.

15. A processor adapted to receive instructions and data from a main memory over a communication port, the processor comprising:
   a. a processor core adapted to execute the instructions, the processor core having a virtual-address output port adapted to output virtual addresses; and
   b. a translation look-aside buffer (TLB) having:
      i. a virtual-address input port connected to the virtual-address output port of the processor core; and
      ii. translation means coupled to the virtual-address input port and having a virtual address field, a physical address field, and a main-memory address field different from the physical address field, wherein the translation means is adapted to translate virtual addresses to main-memory addresses and physical addresses.

16. The processor of claim 15, wherein the memory interconnect is adapted to connect to a main memory physically separate from the processor via the memory interconnect.

17. A system adapted to receive instructions and data from a main memory over a memory interconnect, the system comprising:
   a. a processor core adapted to execute the instructions, the processor core having a virtual-address output port adapted to output virtual addresses;
   b. a translation look-aside buffer (TLB) having:
      i. a virtual-address input port connected to the virtual-address output port of the processor core; and
      ii. a plurality of TLB entries, each TLB entry including a virtual address field, a physical address field, and a main-memory address field different from the physical address field; and
   c. an address translation unit adapted to translate ones of the virtual addresses absent from the TLB to physical addresses.

18. A translation look-aside buffer (TLB) comprising:
   a. an address input port; and
   b. a plurality of TLB entries;
   c. wherein each TLB entry includes a main-memory address field storing a main-memory address and a physical address field storing a physical address different from the main-memory address.

19. The TLB of claim 18, wherein the main-memory address field includes a row field.

20. The TLB of claim 18, wherein the main-memory address field includes a bank field.

21. The TLB of claim 18, wherein the main-memory address field includes a column field.

22. The TLB of claim 18, wherein the main-memory address field includes a device field.

23. The TLB of claim 18, wherein the address input port is adapted to receive at least a portion of a virtual address.

24. The TLB of claim 18, wherein the address input port is configured to receive at least a portion of a physical address.

25. A semiconductor device containing the TLB of claim 18.

26. The semiconductor device of claim 25, further comprising a CPU core.

27. The semiconductor device of claim 25, further comprising a graphics controller.

28. The semiconductor device of claim 25, further comprising a memory controller.

* * * * *